United States Patent [19]
Schroeder

[11] Patent Number: 6,005,988
[45] Date of Patent: Dec. 21, 1999

[54] METHOD AND APPARATUS FOR RAPID DIGITAL IMAGE RESIZING

[75] Inventor: Dale W. Schroeder, Scotts Valley, Calif.

[73] Assignee: Hewlett-Packard Company, Palo Alto, Calif.

[21] Appl. No.: 08/421,582

[22] Filed: Apr. 12, 1995

[51] Int. Cl.[6] ................................................ H04N 1/393
[52] U.S. Cl. .................. 382/298; 345/127; 348/581; 395/102; 395/139
[58] Field of Search ..................................... 382/298, 299, 382/300; 358/451, 528; 345/127, 129, 130, 131; 348/581; 395/102, 172, 128, 139; 364/715.07

[56] References Cited

U.S. PATENT DOCUMENTS

5,025,325  6/1991  Hudson ................................... 358/447
5,309,253  5/1994  Ariga et al. ............................. 382/298

*Primary Examiner*—Leo Boudreau
*Assistant Examiner*—Brian P. Werner

[57] ABSTRACT

A method for enlarging or shrinking stored digital video images is described herein. A user supplied resizing factor which is not arbitrarily limited is used to calculate a scaling factor, which is used repetitively to indicate which of the original pixels is retained in the final image and when new pixels of video information must be generated. This same scaling factor indicates the effective color distance between the retained pixels' color information and the color information which must be generated for the new pixel. The systems uses only unsigned additions and divisions by two, which greatly increase its speed over known scaling methods.

12 Claims, 6 Drawing Sheets

This example upsizes from 24 pixels to 71 pixels.
Increment value = ((24-1) (1048576) / (71-1)) + 1
                  (24117248/70) + 1
                  54ld5 Hex The increment value and running total are in Hex. The running total is one number comprised of three parts, input pixel number, fraction and remainder, separated by spaces to better show function.

| iteration number | RUNNING TOTAL | | |
|---|---|---|---|
| | input pixel number (0 to 23) | Fraction (0 to 15) | Remainder |
| 01 | 000 | 0 | 0000 |
| 02 | 000 | 5 | 41d5 |
| 03 | 000 | a | 83aa |
| 04 | 000 | f | c57f |
| 05 | 001 | 5 | 0754 |
| 06 | 001 | a | 4929 |
| 07 | 001 | f | 8afe |
| 08 | 002 | 4 | ccd3 |
| 09 | 002 | a | 0ea8 |
| 10 | 002 | f | 507d |
| 11 | 003 | 4 | 9252 |
| 12 | 003 | 9 | d427 |
| 13 | 003 | f | 15fc |
| 14 | 004 | 4 | 57d1 |
| 15 | 004 | 9 | 99a6 |
| 16 | 004 | e | db7b |
| 17 | 005 | 4 | 1d50 |
| 18 | 005 | 9 | 5f25 |
| 19 | 005 | e | a0fa |
| 20 | 006 | 3 | e2cf |
| 21 | 006 | 9 | 24a4 |
| 22 | 006 | e | 6679 |
| 23 | 007 | 3 | a84e |
| 24 | 007 | 8 | ea23 |
| 25 | 007 | e | 2bf8 |
| 26 | 008 | 3 | 6dcd |
| 27 | 008 | 8 | afa2 |
| 28 | 008 | d | f177 |
| 29 | 009 | 3 | 334c |
| 30 | 009 | 8 | 7521 |
| 31 | 009 | d | b6f6 |
| 32 | 00a | 2 | f8cb |
| 33 | 00a | 8 | 3aa0 |
| 34 | 00a | d | 7c75 |
| 35 | 00b | 2 | be4a |
| 36 | 00b | 8 | 001f |

FROM Figure 5A

| | | | |
|---|---|---|---|
| 37 | 00b | d | 41f4 |
| 38 | 00c | 2 | 83c9 |
| 39 | 00c | 7 | c59e |
| 40 | 00c | d | 0773 |
| 41 | 00d | 2 | 4948 |
| 42 | 00d | 7 | 8b1d |
| 43 | 00d | c | ccf2 |
| 44 | 00e | 2 | 0ec7 |
| 45 | 00e | 7 | 509c |
| 46 | 00e | c | 9271 |
| 47 | 00f | 1 | d446 |
| 48 | 00f | 7 | 161b |
| 49 | 00f | c | 57f0 |
| 50 | 010 | 1 | 99c5 |
| 51 | 010 | 6 | db9a |
| 52 | 010 | c | 1d6f |
| 53 | 011 | 1 | 5f44 |
| 54 | 011 | 6 | a119 |
| 55 | 011 | b | e2ee |
| 56 | 012 | 1 | 24c3 |
| 57 | 012 | 6 | 6698 |
| 58 | 012 | b | a86d |
| 59 | 013 | 0 | ea42 |
| 60 | 013 | 6 | 2c17 |
| 61 | 013 | b | 6dec |
| 62 | 014 | 0 | afc1 |
| 63 | 014 | 5 | f196 |
| 64 | 014 | b | 336b |
| 65 | 015 | 0 | 7540 |
| 66 | 015 | 5 | b715 |
| 67 | 015 | a | f8ea |
| 68 | 016 | 0 | 3abf |
| 69 | 016 | 5 | 7c94 |
| 70 | 016 | a | be69 |
| 71 | 017 | 0 | 003e |

Note 17H = 23D 24th pixel

Figure 5B

This example upsizes from 62 pixels to 25 pixels.
Increment value = ((62-1) (1048576) / (25-1)) + 1
 (63963136/24) + 1
 28aaab Hex The increment value and running total are in Hex. The running total is one number comprised of three parts, input pixel number, fraction and remainder, separated by spaces to better show function.

|  | ⎡----------RUNNING TOTAL----------⎤ | | |
|---|---|---|---|
| iteration number | input pixel number (0 to 23) | Fraction (0 to 15) | Remainder |
| 01 | 000 | 0 | 0000 |
| 02 | 002 | 8 | aaab |
| 03 | 005 | 1 | 5556 |
| 04 | 007 | a | 0001 |
| 05 | 00a | 2 | aaac |
| 06 | 00c | b | 5557 |
| 07 | 00f | 0 | 0002 |
| 08 | 011 | c | aaad |
| 09 | 014 | 5 | 5558 |
| 10 | 016 | e | 0003 |
| 11 | 019 | 6 | aaae |
| 12 | 01b | f | 5559 |
| 13 | 01e | 8 | 0004 |
| 14 | 021 | 0 | aaaf |
| 15 | 023 | 9 | 555a |
| 16 | 026 | 2 | 0005 |
| 17 | 028 | a | aab0 |
| 18 | 02b | 3 | 555b |
| 19 | 02d | c | 0006 |
| 20 | 030 | 4 | aab1 |
| 21 | 032 | d | 555c |
| 22 | 035 | 6 | 0007 |
| 23 | 037 | e | aab2 |
| 24 | 03a | 7 | 555d |
| 25 | 03b | 0 | 0008 |

Note 03d hex = 61 dec = pixel #62

*Figure 6*

METHOD AND APPARATUS FOR RAPID DIGITAL IMAGE RESIZING

BACKGROUND OF THE INVENTION

This invention is in the field of digital image storage and display. In particular it relates to methods for resizing digital images.

Digital images, whether generated by computer or captured from a video camera or other video source, often need to be scaled in size before being displayed on a CRT or printed by an output device such as a laser printer. The images may need to be either enlarged or shrunk.

Known methods for resizing digital images usually involve the calculation of a special table for each different image size. The table contains the scaling factors which will be applied to the digital data to resize the image. Calculating each table is time consuming, requiring from 1 to 8 seconds and many complex calculations. Resizing the digital image using the tables is even more time consuming. As each color in the digital image requires a separate table and separate processing, the resizing of a single digital color image is generally a very time consuming and processor intensive task.

Certain systems use specialized hardware to speed up the resizing process. Unfortunately, this solution is extremely expensive and limited in the available scaling options.

No known method for resizing digital images is both fast and inexpensive.

SUMMARY OF THE INVENTION

The present invention, in its first preferred embodiment, comprises a method for resizing digital images that is simple, fast, very flexible and very accurate. No special hardware is required, and the method taught by the present invention resizes images much faster than known methods. As all the color information needed for a given pixel can be calculated simultaneously, the overall time required to resize the image is even further reduced.

The process begins by calculating a scale factor. Typically this will be done by dividing the number of input pixels (minus one) by the number of output pixels(minus one). Images may need scaling in both length(X-axis) and width (Y-axis). As the scaling factor in the X-axis may be different from the scaling factor in the Y-axis, and as the present invention scales in both axes with equal facility, this description will only detail cases of enlargement and reduction in the X-axis. Those additional details necessary to understand the invention's scaling in the Y-axis will be provided.

The scaling factor will be an irrational number with either a zero as its integer part, in the case of enlargement, or an integer, in the case of image reduction. Once calculated, the scaling factor is split up in a particular way. The integer part, either zero or non-zero as the case may be, is placed in a pixel number portion of a first register. The first number of the fractional part of the scaling factor is stored in a fraction portion of the first register, and the rest of the scaling factor's fractional part is stored in a remainder portion of the first register.

As the first register initially contains all zeros, the method begins by adding the indicated portions of the scaling factor into the first register in the manner previously indicated. After this first addition, the number in the pixel number portion of the first register indicates which of the pixels in the stored image is used as the basis for forming the new pixel information. The number in the fractional portion of the first register indicates which scaling subroutine should be applied to the selected pixel, and the fractional portion serves as a running accumulator which can eventually affect both the fraction portion and the pixel portion of the first register.

The scaling subroutines use a recursive binary process to calculate the desired intermediate pixel information. As the subroutines are both recursive in nature and based on a binary pattern, all multiply and divide operations within the subroutines can be performed as shift right or shift left operations, which require very little processor time, especially when compared to complex multiplication and division.

After the selected pixel has gone through the proper subroutine and new pixel data created and stored, the scale factor is again added to the first register. This process continues repetitively until the pixel number in the register equals the original input pixel number minus one. During these repetitive additions, the quantity stored in the remainder portion of the first register overflows periodically, which affects which scaling subroutine is applied to the pixel indicated by the pixel number portion of the register. A similar overflow condition from the fraction portion of the first register to the pixel number portion of the first register periodically changes the pixel used as the starting point for the selected subroutine. Both overflow conditions permit a "smoothing" of the overall scaling process, resulting in a more visually accurate final product.

It should be understood that the new pixel data created from the pixel indicated by the pixel number portion of the first register, although conceptually lying between the indicated pixel and the next successive original pixel, is physically realized as another pixel of actual printed or displayed data. This extra data results in the physical enlargement of the final image.

The present invention functions in exactly the same manner when a stored digital image is reduced in size, except in this case some of the originally stored pixel data may be discarded. Furthermore, the operation of the present invention is identical regardless of the calculated scaling factor, including the case where the scaling factor is one.

The present invention will now be described in detail, with reference to the figures listed and described below.

BRIEF DESCRIPTION OF THE ILLUSTRATIONS

BRIEF DESCRIPTION OF THE APPENDICES

Appendix A is a listing of the subroutines used in the present invention to calculate intermediate pixel information between two horizontal lines of digital video data; and Appendix B is a listing of the subroutines used in the present invention to calculate intermediate pixel information between pixels in the same horizontal line of digital video information.

DETAILED DESCRIPTION OF THE PREFERRED EMBODIMENT

Figure 1:
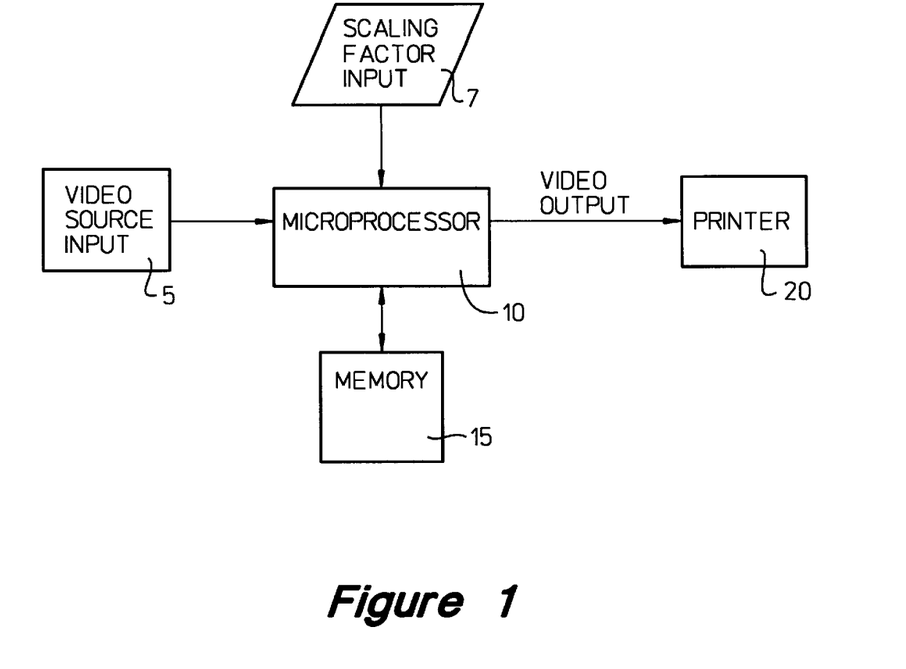
FIG. 1 is a block diagram of the operating environment of the present invention.

FIG. 1 is a block diagram showing the basic operating environment of the present invention. A general purpose microprocessor 10 is coupled to a memory 15, a digital video data input source 5,and a scaled video data output destination, here a printer 20. Any of the many known types of microprocessors could be used, just as any appropriate combination of random access memory("RAM"), read only memory("ROM"), hard disk memory or floppy disk memory can be used. Although video input source 5 is shown independent of memory 15, nothing herein prevents the present invention from operating on previously stored digital video images. In a similar fashion, although printer 20 is shown as the scaled video data output destination, the destination could as readily be memory 15 or a video monitor. Changes in the hardware used with the present invention do not go to the basic teaching of the present invention, as long as the minimum operating characteristics of the described elements are retained.

A resizing factor 7 is a user supplied input variable and it is provided to microprocessor 10.

Figure 2:
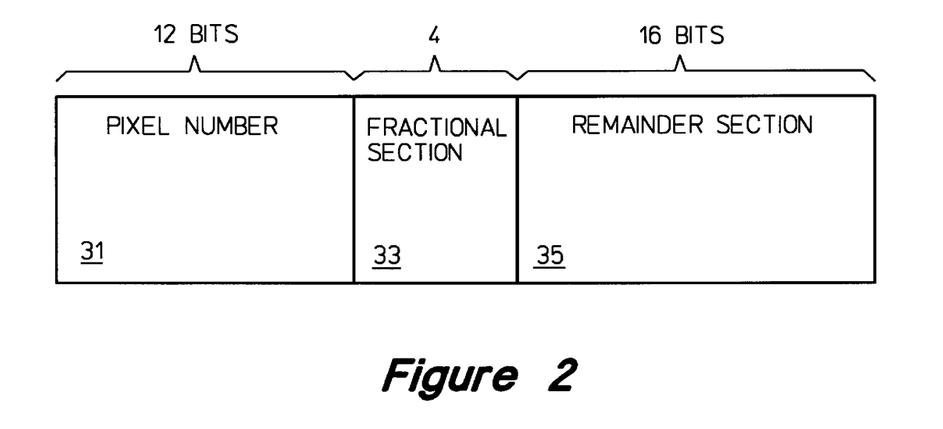
FIG. 2 shows the structure of the scale factor and scaling registers used in the first preferred embodiment of the present invention.

FIG. 2 illustrates the internal structure of a scale factor register and a scaling register used in this first embodiment of the present invention. In this embodiment, both registers are 32-bits wide, with a 12-bit pixel number section 31, a 4-bit fractional section 33, and a 16-bit remainder section 35. 4096 input pixels can be expanded to up to 65K output pixels. The contents of the scale factor register change only when a new resizing factor is entered. The contents of the scaling register change continuously during operation of the present invention. Nothing herein should be taken to imply that these registers can only be 32-bits wide. A smaller register could be used, which would change either the number of input or output pixels, or both, and/or result in a loss of accuracy in the final image. A larger register could also be used, which would result in a visually more accurate final image at the cost of extra memory and some increase in computational time.

Figure 3:
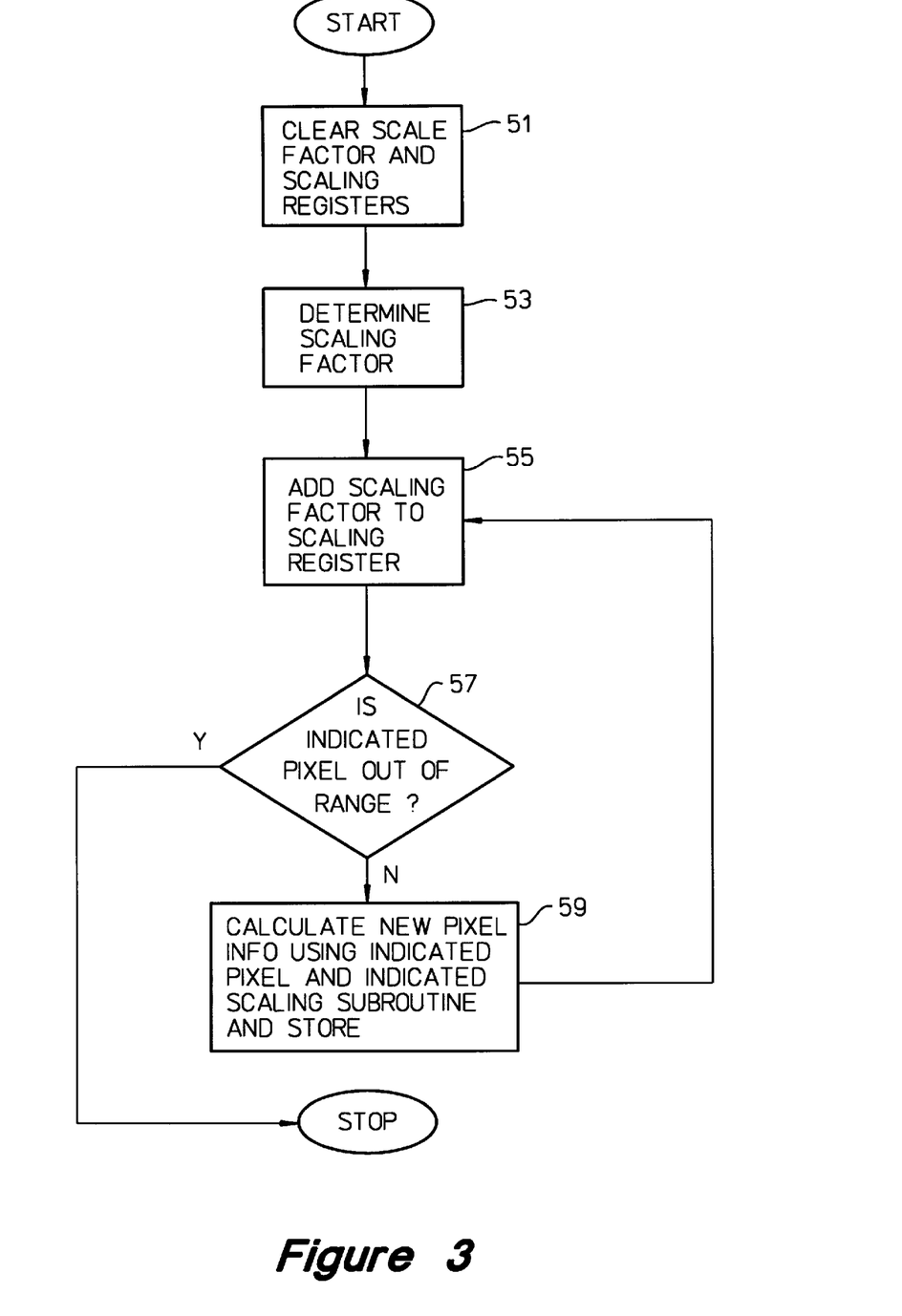
FIG. 3 is a flow chart showing the operation of the first preferred embodiment of the present invention.

The basic operation of the present invention's first preferred embodiment is illustrated by the flow chart shown in FIG. 3. Operation begins by clearing the scale factor register and the scaling register. The resizing factor is a user supplied variable and comprises a ratio of the number of pixels per line in the digital video image being scaled and the number of pixels per line in the desired final video image. Typically, there will be a different resizing factor for both the X and Y axis of the image being scaled. As the operation of the present invention is identical with respect to both axes, only a scaling of the X axis will be described in detail. In operation, the scaling along the two axes would proceed sequentially. A1

The scaling factor is calculated at step 53 by subtracting one from both the number of input pixels per line and the number of output pixels per line. The resulting number of input pixels is then multiplied by 100000Hex(100000 Hex= 1,048,576 Dec). This moves the number into proper alignment and permits the use of integer mathematical operations. After this subtraction and multiplication, the input pixels per line are divided by the remaining output pixels per line. One is added to the result to make the truncation errors positive instead of negative. The result of this division and addition are stored in the scale factor register. This value does not change until a new scaling factor is calculated.

After the scaling factor is calculated at step 53, the scaling factor is added to the scaling register at step 55. The contents of the scaling register, particularly the contents of each section of the scaling register, determine the further operation of the present invention.

At step 57, if the contents of the fractional part of the register equal zero, the contents of the pixel number section of the scaling register is compared with the number of input pixels. This comparison only occurs when the fractional contents are zero. If the number in the pixel number section of the scaling register equals the number of input pixels minus one, then the scaling process has been completed and operation of this embodiment of the present invention ceases. If the contents of the fractional part of the register are not zero, or if the number in the pixel number section of the scaling register does not equal the number of input pixels minus one, the video data contained in the indicated pixel number is stored and further intermediate pixel data is calculated using the indicated pixel number as a starting point. In cases where the digital video image is being enlarged, all pixels received as input will form part of the final scaled output. In cases where the received image is being scaled down, some of the received pixels will not form part of the final output. In these cases, when a pixel is not indicated at any time during the operation of the present invention, it is simply discarded.

If the indicated pixel number is within range, then, at step 59, intermediate additional pixel data may need to be calculated. The fractional section is used in this case as an indicator of the fractional distance between the indicated pixel number and the next pixel number in the received input pixels where new pixel information must be formed. This can be explained by the case where an image is doubled in size along one axis. For every pixel of received digital video data, except the first and last pixel, a new pixel of video data is formed, in content halfway between the indicated values of both the first and second input pixels' video data. In this case, the new pixel's video information is calculated by adding the video data contained in the received first and second pixels and dividing by two to form the new, intermediate video data. Not all cases will be this simple. The fractional section of the scaling register indicates the fractional distance between the first indicated received pixel of video information and the next pixel. This fractional distance is used as an indicator to choose the appropriate scaling subroutine necessary to create a new pixel of video information whose content closely approximates the fractional distance between the contents of the first and second received pixels.

The various scaling subroutines are attached hereto as Appendices A and B. The only mathematical operations which occur within these subroutines are unsigned binary additions and binary division. As this division is always a division by two, and as the present invention operates in a binary environment, this division is actually always a single shift right operation.

Earlier, the simple case of generating a new pixel between two existing pixels was described. The subroutines use the same operations used for this simple case to generate new pixels at any intermediate distance between the two original pixels. The process is recursive in nature and continues to a predefined maximum depth. In this first preferred embodiment, the fractional section is four bits wide. Therefore, the distance between two existing pixels is divided into 16 increments.

Two things must be understood about the new pixel being created. First, its fractional distance is only an indication of the relative weighing of the first and second pixels video content information necessary to create the video information content of the new pixel. Thus, if the present system were operating in a black and white system, 16 gray levels between an absolute white pixel and an absolute black pixel could be created, the gray level being determined by the contents of the fractional section and the subroutine it indicates. Second, the new pixel, although it conceptually lies between two pixels, will, when printed or displayed in whatever fashion, occupy physical space. Thus, physically doubling a line length consists of creating one new pixel between each pair of existing pixels.

Other scaling factors will of course require the creation of more than one intermediate pixel and the shrinking of an image will require the removal of certain pixels. If more intermediate gray or color levels are desired, the size of the scale factor and scaling registers can be increased.

Figure 4:
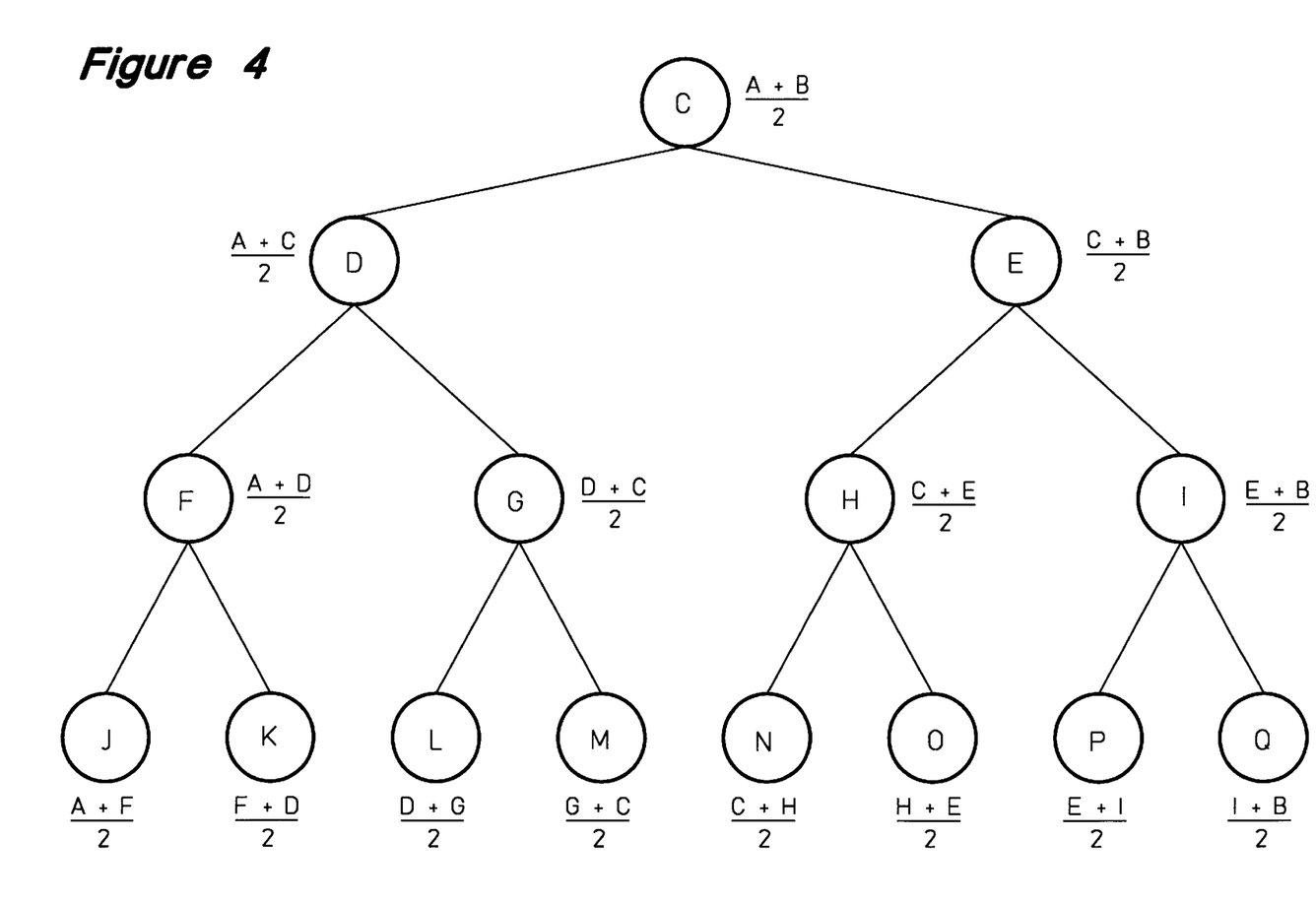
FIG. 4 illustrates how each of the sixteen incremental pixels would be calculated in this first preferred embodiment.

The subroutine is called with the pixel number, which actually indicates the starting address of the first pixel and the fractional number which indicates the fractional distance required. As stated, the subroutine is recursive in nature. Using the starting address indicated by the pixel number, it adds the contents of that pixel(hence, pixel A) and the next successive original pixel(hence, pixel B) and divides by 2, which, as the present invention uses binary numbers, comprises a shift right by one. If the fractional number is 0, no intermediate data needs to be calculated, the operation of the subroutine halts, and the original pixel's video content is used. If the fractional number is greater than zero, the addresses of the starting pixel number and the next successive pixel number are changed as appropriate and additions and divisions continue until the new pixel's correct video content is calculated. FIG. 4 shows a binary tree and the pixels used to calculate each node in the tree. This tree is a pictorial representation of the recursive subroutines provided in both Appendix A and Appendix B. In the actual realization of this first preferred embodiment of the present invention, a separate subroutine comprised of all the steps necessary to calculate a pixel of the indicated fractional distance from the indicated starting pixel number is used. This improves overall system speed, as recursive procedure calls are always relatively slow.

Referring briefly back to FIG. 3, after new pixel data is calculated at step 59, control returns to step 55 where the scaling factor is again added to the scaling register. Steps 55, 57, and 59 repeat until the indicated pixel number equals the number of original pixels minus one. At that point, operation ceases.

The remainder portion of the scaling register serves to correct for certain averaging errors that enter into scaling operations. Not every scale factor is an even number, and consequently some averaging between certain pixels must occur to maintain visual accuracy. As the remainder register overflows, it changes the subroutine that will be applied to the relevant pixel, thus providing an important averaging along uneven pixel boundaries. This aspect of the present invention's operation will be more fully explained in conjunction with the description of FIGS. 5 and 6 which follows.

The digital color images that the present invention operates on are stored in a particular format. Each pixel's color information is stored as a so-called "trixel". For example, if color is formed as a combination of cyan, magenta, and yellow, then the trixel contains 8-bits of cyan data, 8-bits of magenta data, and 8-bits of yellow data, all stored with appropriate blank spaces in a single 32-bit word. In operation, all additions and divisions operate on the entire "trixel" simultaneously, thereby allowing the present invention to perform the sizing process on all the colors simultaneously, again providing the present invention with a significant speed advantage over known sizing methods. Certain slight modifications to the adding and dividing operations of the subroutines are required when using such trixel color information. After the color information of pixel A and pixel B is added, a 1 is added to each least significant bit of the 8-bit data subsections in the register holding the product of pixel A plus pixel B. This changes the rounding error from +0/−1 to +/−0.5. An AND operation which follows removes the least significant bit of each color. The division by two( a shift right operation) then follows. These two operations do not change the fundamental teachings of the present invention and are only needed to accommodate certain rounding errors that can occur when using "trixel" color information.

Figure 5A:
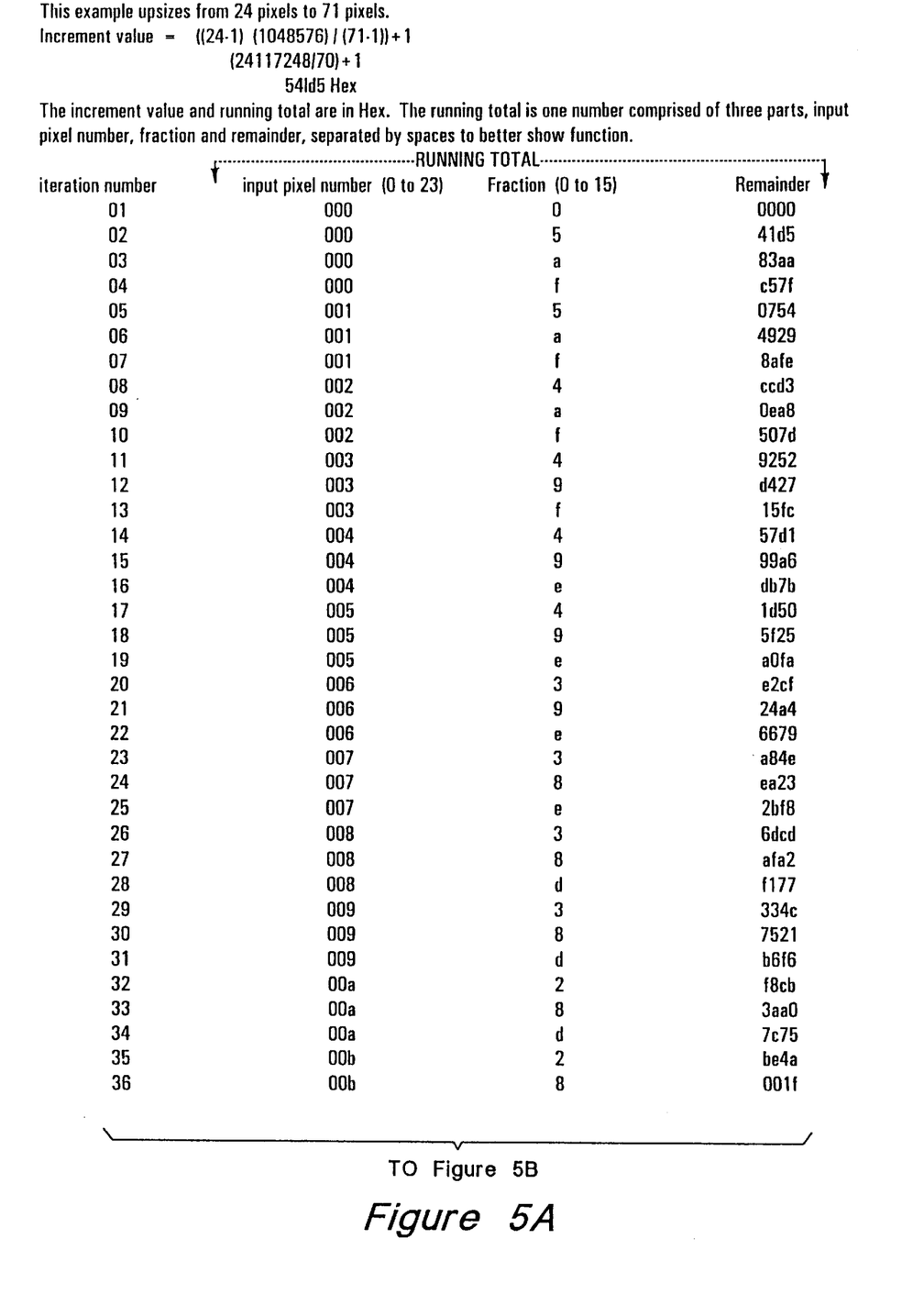
FIG. 5 is an example of how the first preferred embodiment of the present invention enlarges a digital image.
Figure 5B:
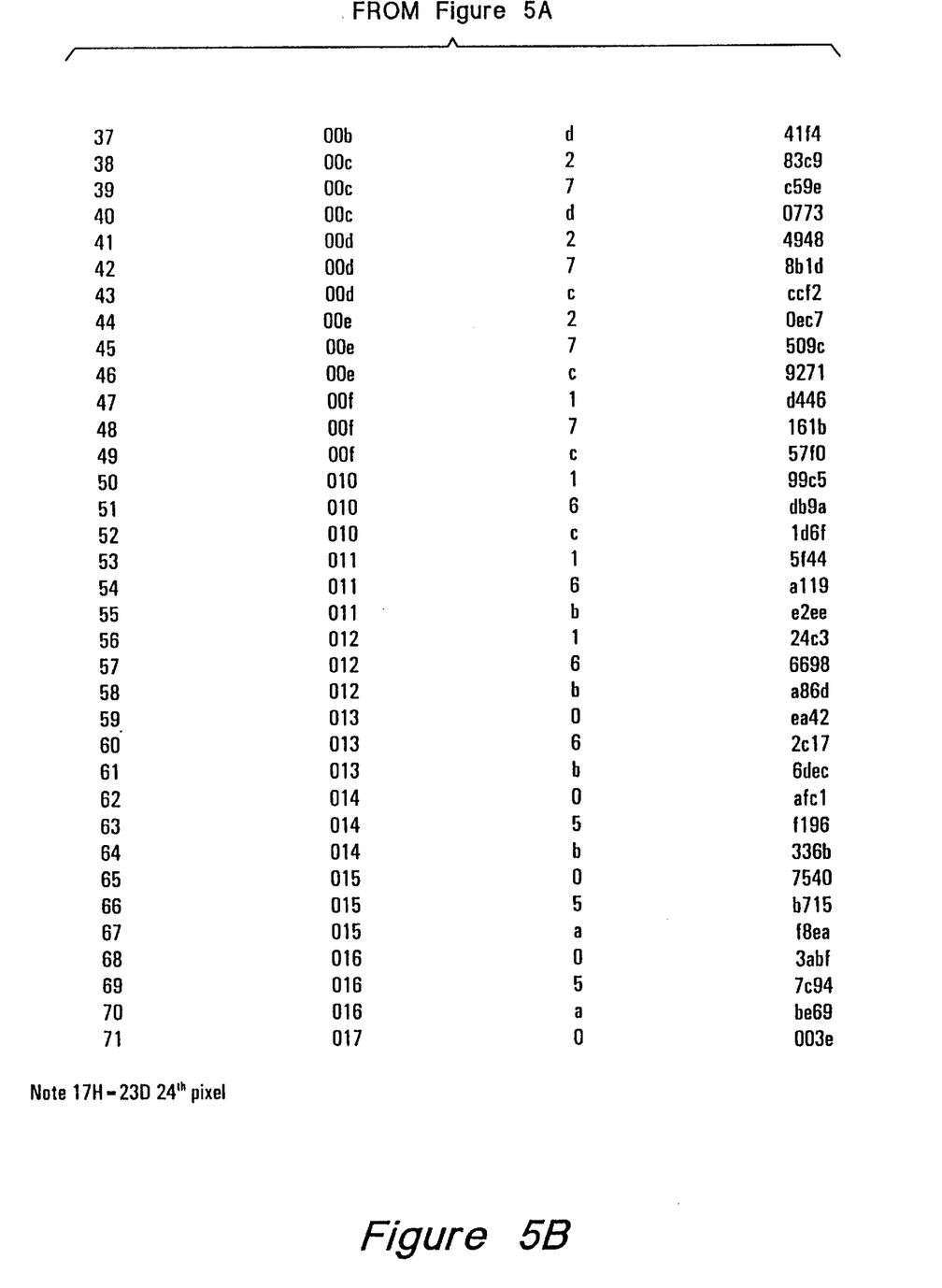
Figure 6:
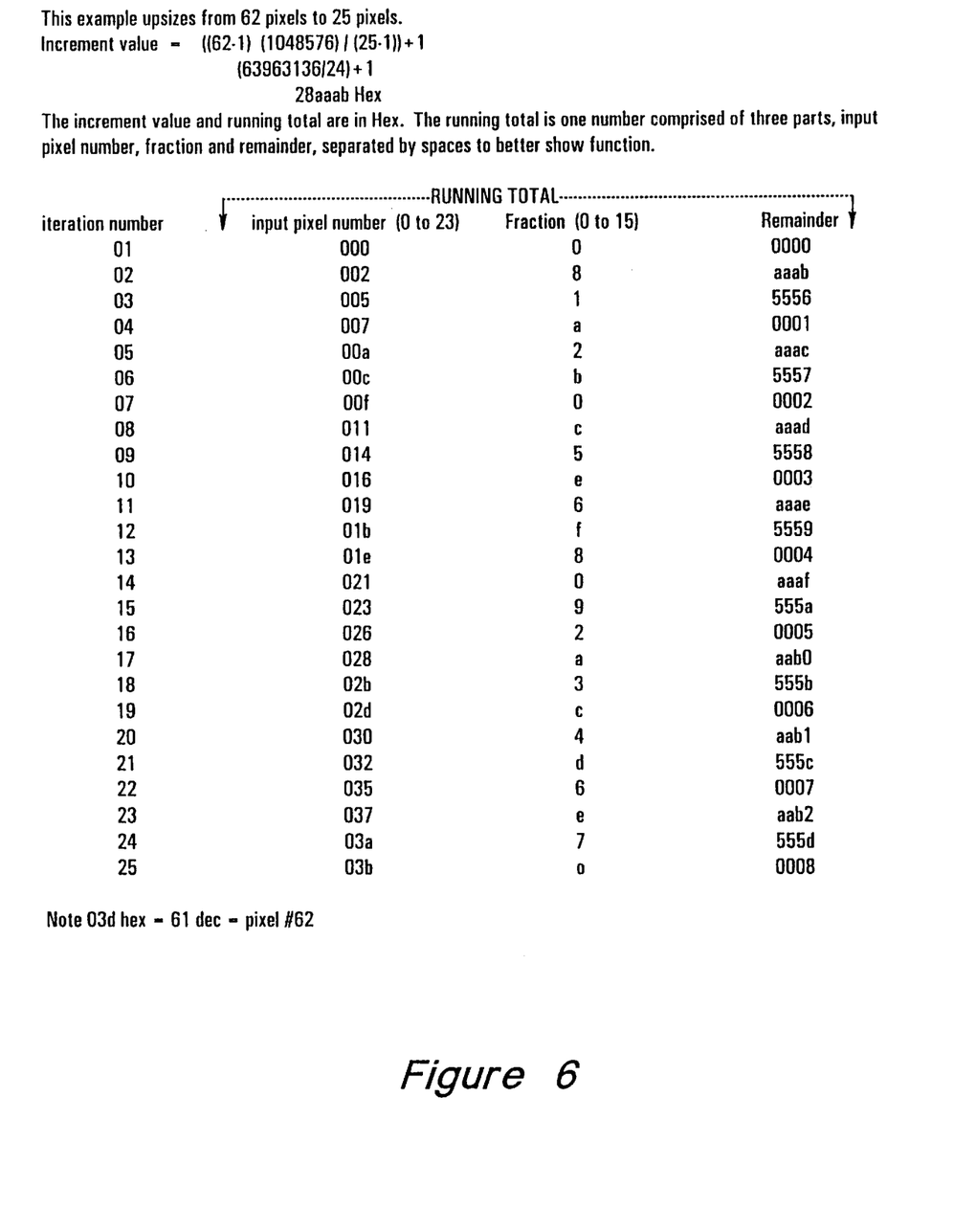
FIG. 6 is an example of how the first preferred embodiment of the present invention shrinks a digital image.

FIGS. 5 and 6 are examples illustrating the scaling process of the present invention. These examples are given in hexadecimal notation. The conversion of the numbers to binary or decimal numbers is known.

FIG. 5 shows how the present invention operates to scale a 24 pixel line to 71 pixels. The calculation of the scaling factor is shown. After its calculation, its repetitive addition into the scaling register begins. Pixel 0 is used in this example as the basis for four new pixels.

FIG. 6 shows how the present invention operates to scale a 62 pixel line to 25 pixels. The calculation of the scaling factor is shown. After its calculation, its repetitive addition into the scaling register begins. As shown, pixel 0 is the first pixel to be used to form the new image, and as its fractional part is zero, it does not fall through one of the subroutines but is simply stored as part of the new image.

Any scale factor may be used with the present invention, and its operation would be essentially identical to that just shown with the examples of FIGS. 5 and 6.

What is claimed is:

1. A method for resizing digital video images, the method comprising the steps of:

accepting a digital video image as input;

calculating a scaling factor form user supplied information;

storing the scaling factor in a first register and repetivitvely adding it to a second register which includes bits allocated for a pixel number portion, a fraction portion, and a remainder portion;

using the pixel number indicated by the second register after each repetitive addition to apply one of a plurality of scaling subroutines to a pixel of the received digital video image, the pixel of received digital video image indicated by the pixel number, the scaling subroutine indicated by the fractional portion of the second register;

storing a new pixel of digital video data created by the scaling subroutine after each repetitive addition; and continuing the steps of storing, using, and storing until the pixel number in the second register equals the number of pixels in the accepted digital video image minus one.

2. The method of claim 1 wherein th step of calculating the scaling factor comprises the additional steps of:

accepting as input the number of input pixels and the number of output pixels;

subtracting one form both the number of input pixels and the number of output pixels;

multiplying the remaining number of input pixels by 1000000Hex;

dividing the multipoied remaining number of input pixels by the remaining number of output pixels; and adding one to the result of the dividing step to form the scaling factor.

3. The method of claim 2 wherein the first storing step can further cause a remainder portion of the second register to overflow into the fractional portion of the second register, which in turn can cause the fractional portion of the second register to overflow into the pixel number of the second register, such overflows changing the scaling subroutine if the remainder portion overflows into the fractional portion and additionally changing the pixel number of the second register if the fractional portion overflows into the pixel number.

4. A method for resizing stored digital images comprising the steps of:

calculating a scaling factor and storing it in a scale factor register which includes bits allocated for a pixel number portion, a fraction portion, and a remainder portion;

adding the scaling facrot to a scaling register which includes bits allocated for a pixel number portion, a fraction portion, and a remainder portion;

generating resized digital images from the stored digital images using the scaling factor and software means for performing unsigned mathematical operations, wherein the pixel number indicated by the scaling register after each addition is used to apply one of a plurality of scaling subroutines to a pixel of the received digital video image, the pixel of received digital video image indicated by the pixel number, the scaling subroutine indicated by the fractional portion of the scaling register; and repeating the adding and generating steps until a last pixel of the stored digital image has been resized.

5. The method of claim 4 wherein the step of calculating the scaling factor comprises teh additional steps of:

accepting as input the number of pixels per line in the stored digital image and the number of desired pixels per line in the resized digital image;

subtracting a first predefined number from both the number of pixels per line in the stored digital image and the number of desired pixels per line in the resized digital image;

multiplying the remaining number of pixels per line in the stored digital image by a second predefined number to form a first result;

dividing the first result by the remaining number of desired pixels per line in the resized digital image to form a second result; and adding a third predefined number to the second result to form the scaling factor.

6. The method of claim 5 wherein the step of generating a resized digital image from the stored digital image using the scaling factor further comprises the steps of:

selecting a pixel of the stored digital image using the pixel number portion of the scale register; and applying a scaling subroutine means to the pixel, the scaling subroutine means indicated by a fractional portion of the scale register.

7. The method of claim 6 wherein the step of adding the scaling factor to the scale register can cause the remainder portion of the scale register to overflow into the fractional portion of the scale register, which mayh in turn cause an overflow from the fractional portion of the scale register into the pixel number portion of the scale register, the two overflow conditions changing respectively the indicated scaling subroutine and the selected pixel number.

8. The method of claim 5, wherein the first predefined number is one.

9. The method of claim 5, wherein the second predefined number is 100000 Hex.

10. The method of claim 5, wherein the third predefined number is one.

11. The method for resizing digital video images of claim 1, wherein the steps are performed simultaneously on multiple data subsections.

12. The method for resizing digital video images of claim 11, wherein the multiple data subsections represent pixel color information.

* * * * *